US012350721B2

(12) United States Patent
Kleinrichert, Jr. et al.

(10) Patent No.: US 12,350,721 B2
(45) Date of Patent: Jul. 8, 2025

(54) SYSTEM AND METHOD FOR COATING REMOVAL

(71) Applicants: Gregory Alan Kleinrichert, Jr., Jacksonville, FL (US); Gregory Alan Kleinrichert, Sr., West Palm Beach, FL (US); Timothy Gerard Niemeier, Macungie, PA (US)

(72) Inventors: Gregory Alan Kleinrichert, Jr., Jacksonville, FL (US); Gregory Alan Kleinrichert, Sr., West Palm Beach, FL (US); Timothy Gerard Niemeier, Macungie, PA (US)

( * ) Notice: Subject to any disclaimer, the term of this patent is extended or adjusted under 35 U.S.C. 154(b) by 0 days.

(21) Appl. No.: 18/895,670

(22) Filed: Sep. 25, 2024

(65) Prior Publication Data

US 2025/0128300 A1 Apr. 24, 2025

Related U.S. Application Data

(60) Provisional application No. 63/560,966, filed on Mar. 4, 2024, provisional application No. 63/545,177, filed on Oct. 21, 2023.

(51) Int. Cl.

*B08B 7/00* (2006.01)
*B08B 1/16* (2024.01)
*B08B 5/04* (2006.01)

(52) U.S. Cl.

CPC ............ *B08B 7/0035* (2013.01); *B08B 1/165* (2024.01); *B08B 5/04* (2013.01)

(58) Field of Classification Search

CPC ... B08B 7/0035; B08B 7/0042; B08B 7/0064; B08B 7/0071; B08B 1/16; B08B 1/165; B08B 5/04; B08B 5/043; B08B 5/046

See application file for complete search history.

(56) References Cited

U.S. PATENT DOCUMENTS 5,660,753 A * 8/1997 Lingnau ................ B44D 3/168 219/676
2015/0122293 A1 * 5/2015 DesOrmeaux .......... B08B 9/093 248/371

FOREIGN PATENT DOCUMENTS

CN 103370844 A * 10/2013 ............ H02G 1/128
JP 2015123420 A * 7/2015 ............ C01B 3/065
JP 5950272 B2 * 7/2016
JP 2022186272 A * 12/2022

* cited by examiner

*Primary Examiner* — C. A. Rivera
(74) *Attorney, Agent, or Firm* — Finnegan, Henderson, Farabow, Garrett & Dunner LLP

(57) ABSTRACT

A system for coating removal is disclosed. The system may include at least one induction head. The at least one induction head may be electrically connected to a power supply wherein the power supply and the at least one induction head are configured to deliver energy to the coating at an energy density level at or above an incineration threshold for the coating. The system may also include a vacuum system configured to extract at least a portion of the coating, including incineration products generated by delivery of the energy to the coating.

19 Claims, 8 Drawing Sheets

SYSTEM AND METHOD FOR COATING REMOVAL

REFERENCE TO RELATED APPLICATIONS

The present application claims the benefit of priority to U.S. provisional application No. 63/545,177 filed on Oct. 21, 2023, and also claims the benefit of priority to U.S. provisional application No. 63/560,966, filed on Mar. 4, 2024, both of which are incorporated by reference herein in their entirety.

TECHNICAL FIELD

The present disclosure generally relates to a system and method for the removal of coatings from metals, including situations in which the coatings contain one or more hazardous materials. Disclosed systems may employ heat induction and/or pulsed laser ablation in combination with waste removal techniques to offer a coating removal solution exclusive of consumable media, such as that used with abrasive blast cleaning.

BACKGROUND INFORMATION

Removing coatings from metal structures can be a challenging task. Current methods include compressed air blast cleaning, which involves blasting small particles of an abrasive material (such as sand, steel grit, or glass beads) mixed with air onto the surface to dislodge the coating. Abrasive blast cleaning generates high noise levels and produces a large volume of dust and waste consisting of the used abrasive blast media mixed with the removed coating material. Further, compressed air equipment can easily consume hundreds of gallons of fuel each day.

Other methods for removal of coatings include vacuum blast cleaning, wet abrasive blast cleaning, chemical cleaning, hand scraping, and heat gun coating removal. Similar to abrasive blast cleaning, each of these processes can scatter hazardous airborne particulate matter requiring complex containment equipment. In addition to the need for dust containment, abrasive blast cleaning creates an enormous waste stream. For example, it typically takes at least five pounds of abrasive media per square foot to remove 15 mils of existing paint. As such, even a small maintenance project of about 1,000 square feet of surface area may require 5,000 pounds (or more) of blast media to remove a 15-mil coating from that surface area. Further, if the removed coating contains hazardous ingredients, such as lead, all 5,000 pounds of the used media would be considered as hazardous mixed waste that must be collected and disposed of in compliance with hazardous waste disposal regulations at a significant cost. In a typical operation, abrasive blast waste is disposed of in drums that weigh approximately 500 pounds each. In the small maintenance project example described above, the 5,000 pounds of hazardous mixed waste would require at least 10 drums, which can result in significant disposal and handling costs. For large bridge projects where coatings are to be removed from many thousands of square feet of surface area, the abrasive blasting waste disposal can be a significant project costs as well as an environmental hazard.

Alternative solutions to blast cleaning may include the use of heat induction techniques to assist in removal of paint, powder, or varnish coatings from a metal substrate. These techniques rely upon heating of the substrate through application of electrical energy to generate eddy currents in the substrate. While these techniques have been useful to assist in loosening thick coating material (above 0.5 mm) on a metal substrate, traditional induction systems require additional surface preparation to address residual material, rust, and contaminants left on the substrate after the induction process. Additionally, hazardous material coatings that are loosened by traditional induction techniques can require many of the costly airborne vapor and residue containment systems described above in order to properly and safely collect and dispose of the hazardous coating material once scraped or otherwise removed from the substrate.

Pulsed laser ablation is another alternative to abrasive blast cleaning for removing thin coatings of rust, grease, oil, etc. This method ablates the coating through energy transfer from the laser. Despite its effectiveness, laser ablation may be time-consuming and not cost-effective for the removal of thick coating layers (above 0.5 mm). However, laser ablation is very effective at removing residual coating material as well as rust and other contaminants that cannot be removed by traditional induction techniques alone.

Further, as discussed above, coating removal processes are further complicated when the coatings to be removed contain hazardous materials, such as lead, chromium, and cadmium-based pigments found in paints often used in painting metal structures, such as bridges. Removal of such coatings can involve complex operations with safety, health, hygiene, and environmental risks. Currently, removal of hazardous coatings requires complex and costly hazardous materials containment processes. For example, a current process for removal of lead-based coatings from bridges requires an SSPC guide 6 class 2A containment system (high level of emissions control). And, a current process for removal of zinc-based primer/coatings from bridges requires an SSPC class 3A containment system (moderate level of emissions control). Installing a containment system is an expensive and complex undertaking that often leads to deferred or piecemeal bridge maintenance. Even where zone or spot re-painting of bridge elements is available as an alternative to re-painting an entire structure, installation of a containment system for management of waste associated with abrasive blast cleaning (which is required even for zone or spot treatment) often makes such partial maintenance projects cost prohibitive. As a result, maintenance is often deferred so that the cost of containment can be included in the expense of recoating the entire bridge.

Working with hazardous material coatings requires further infrastructure beyond the containment system. For example, to comply with health, safety and hygiene regulations, a decontamination trailer having two separate rooms with a clean and dirty floor is required. And, extensive and costly personal protective equipment (PPE) is also required.

The present disclosure describes solutions aimed at alleviating or overcoming one or more of the above-stated challenges.

SUMMARY

In one embodiment, a system for coating removal is disclosed. The system may include at least one induction head. The at least one induction head may be electrically connected to a power supply wherein the power supply and the at least one induction head are configured to deliver energy to the coating at an energy density level at or above an incineration threshold for the coating. The system may also include a vacuum system configured to extract at least a portion of the coating, including incineration products generated by delivery of the energy to the coating.

In another embodiment, a system for coating removal is disclosed. The system may include at least one induction head. The at least one induction head may be electrically connected to a power supply wherein the power supply and the at least one induction head are configured to deliver energy to the coating at an energy density level at or above an incineration threshold for the coating. The system may also include a vacuum system configured to extract at least a portion of the coating, including incineration products generated by delivery of the energy to the coating. The system may also include a laser system configured to ablate or burn off by thermal decomposition the substrate residual layer, and a vacuum system configured to extract products generated by the ablation or thermal decomposition of the residual layer of coating.

In another embodiment, a method for coating removal is disclosed. The method may comprise: using an induction system configured to deliver energy to the coating at an energy density level at or above an incineration threshold for the coating, performing a vacuum stage to extract at least a portion of the coating, including incineration products generated by delivery of the energy to the coating, using a laser system configured to ablate or burn off by thermal decomposition the substrate residual layer, and performing a vacuum stage to extract products generated by the ablation or thermal decomposition of the residual layer of coating.

The foregoing general description and the following detailed description are exemplary and explanatory only and are not restrictive of the claims.

DETAILED DESCRIPTION

Figure 1:
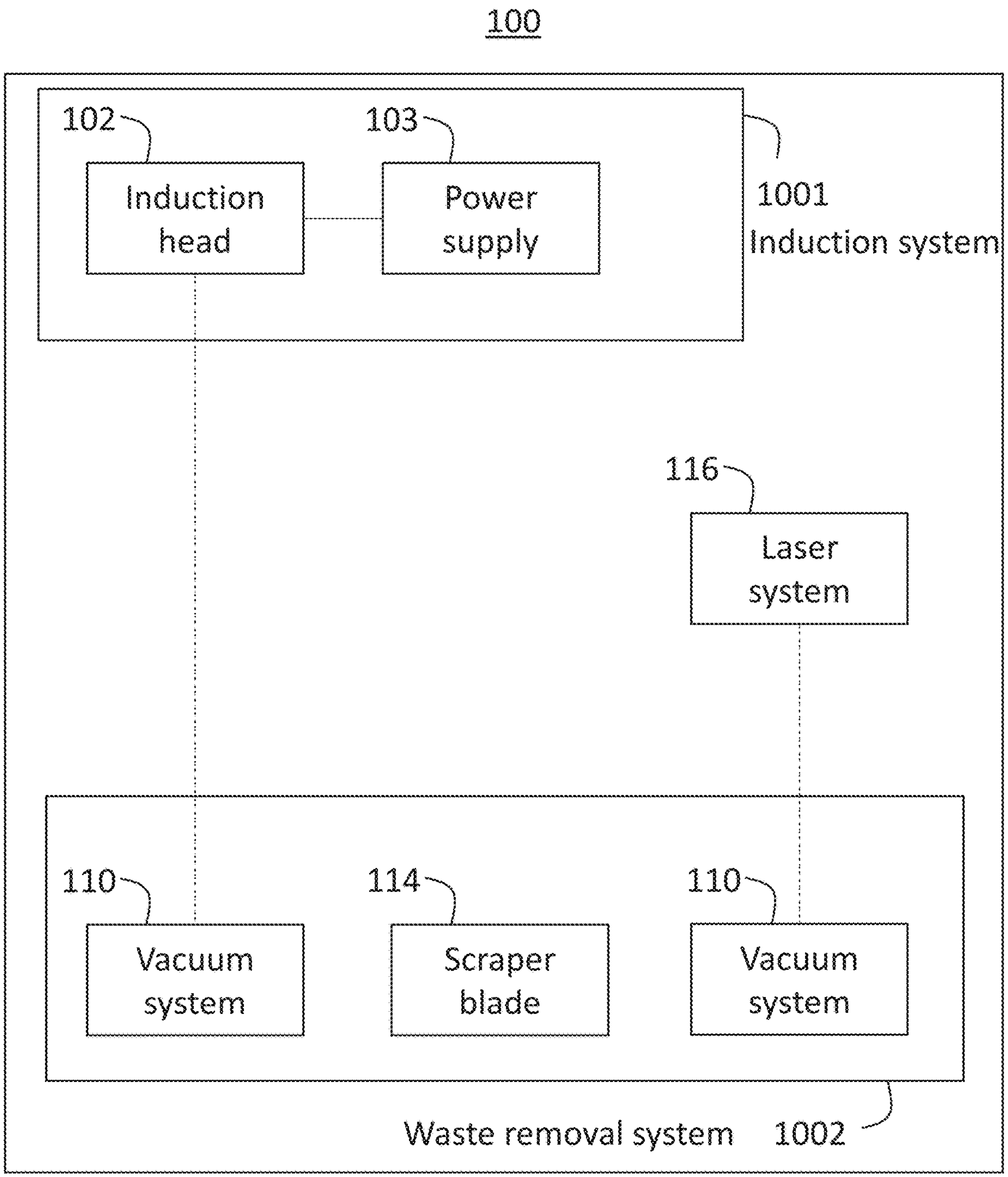
FIG. 1 is an exemplary block diagram of a system for removing coatings from a substrate, according to exemplary disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Embodiments consistent with the present disclosure provide systems and methods for removal of coatings from metal substrates. For example, the presently disclosed systems and techniques offer a media-free process alternative to abrasive blast cleaning, that uses the application of energy and laser light to remove coatings from surfaces. Advantageously, these systems and processes may offer a solution for removal of coatings containing hazardous ingredients without the need for dust containment, media collection and disposal, etc. As a result, the disclosed systems and processes may avoid generation of the large volume of hazardous mixed waste, such as the spent abrasive blast media combined with lead and other heavy metals often resulting from abrasive blasting techniques. Instead, the disclosed systems and processes seek to limit produced waste to vaporized coating residues that can be more easily collected and disposed of without the need for costly containment systems. Further, the disclosed systems can operate at reduced noise levels relative to traditional solutions. Additionally, the disclosed systems can significantly reduce carbon emissions by consuming a fraction of the fuel required by current techniques.

FIG. 1 is a block diagram representation of a system for removing a coating from a substrate, consistent with the disclosed embodiments. System 100 may include various components depending on the requirements of a particular implementation. In some embodiments, system 100 may include an induction system 1001, a laser system 116, and a waste removal system 1002.

These components—the induction system 1001, the laser system 116 and the waste removal system 1002—are designed with an aim toward addressing longstanding needs in the coating removal industry, as described above. For example, the induction system 1001 features a power supply 103 and an induction head 102 combination, which operate together to deliver sufficient energy to the coating to incinerate some or all of the coating material. The incinerated coating may be more easily removed (e.g., as compared to loosened coating material), less residual material may remain on the metal substrate (making subsequent cleaning processes (E.g., laser cleaning, etc.) to remove residual material faster and more efficient), and waste handling and removal (e.g., by the waste extraction system 1002) may be greatly simplified as compared to traditional coating removal techniques. As described in further detail in the sections below, the presently disclosed systems may avoid the need for costly hazardous material containment systems, may greatly reduce the amount of hazardous material requiring handling, and may avoid costly hazardous material transport and disposal schemes.

Induction system 1001, may include various combinations of components configured to deliver energy to a coating on a metal substrate sufficient to incinerate at least a portion of the coating material. It should be noted that for purposes of this disclosure, energy delivery to the coating may refer to the overall process of converting electrical energy from a power supply, such as power supply 103, into heat sufficient to cause incineration of some or all of a coating material on a metal substrate. In the induction process associated with induction system 1001, electrical energy from power supply 103 is converted into magnetic energy using induction head 102. Through induction, this magnetic energy results in generation of surface eddy currents at the substrate which can result in rapid heating of the substrate. This heat energy transfers to the coating material on the substrate at an energy density level sufficient to cause incineration of some or all of the coating material. References to induction, heat induction, induction heating, etc., are used interchangeably in the present disclosure to refer to processes for heating electrically conductive materials through electro-magnetic induction.

As shown in FIG. 1, induction system 1001 may include at least one induction head 102 and a power supply 103 electrically connected to the at least one induction head 102.

Using power supply 103, an amount of energy available for supply to the substrate may be variably selected. For example, a user may select a power output level from 0 to 110 W for delivery of an alternating electrical current to induction head 102. If the user knows the thickness of the coating, predefined power settings may be used. For example, for a 15-mil coating, a power output of 12.5 kW may be chosen. If the user does not know the coating thickness, the power output level may be selected iteratively. Starting from a power output of a few kW for example, the user may gradually increase the power output until the energy density has reached a sufficient level, and some or all of the coating has been incinerated. Additionally, or alternatively, the user may choose the power output as a percentage of the maximum power output of the induction system, and increase the power output by increments of 1%, 5%, or 10% for example.

Induction head 102 may include various configurations dependent on the requirements of a particular application. In the disclosed embodiments, induction head 102 includes an induction coil. Power supplied to induction head 102 (e.g., via electrical energy generated by the power supply 103) causes circulation of alternating current in the coil of induction head 102, which, in turn, causes a rapidly changing magnetic field around the coil. When induction head 102 is activated and positioned in proximity to a metal substrate, the rapidly changing magnetic field induces eddy currents in the metal substrate, which causes heating of the substrate. With sufficient energy transfer from induction head 102 to the metal substrate, the resulting heat generated can be used to incinerate all or a portion of a coating material present on the substrate.

In further detail, alternating current from the power supply is provided to a rectifier voltage regulator. The rectifier voltage regulator maintains a constant direct current voltage output. An inverter converts the direct current into a desired alternating current having a desired frequency for incinerating coating materials. The generated desired alternating current passes through an oscillating capacitor and a high frequency transformer. The high frequency transformer excites an induction coil located within the induction head. The induction head is placed against a ferrous or other compatible material of the base substrate. The induction coil generates energy by creating an inductive coupling between the induction coil and the base material of the subject coated member.

A die hardened induction head of the induction head assembly is held by an induction head hand grip and placed against an exposed surface of the subject coated member outer coating. Induction between the induction head assembly and the material of the subject substrate member transfers energy and generates heat, which incinerates and removes the coating material from the substrate. The induction between the induction head assembly and the material of the subject substrate member generates heat which can also at least partially separate and/or incinerate the coating from the substrate surface. Following a dwell time of the induction coating removal process, the induction head assembly is moved in a direction to expose intact coating material. The distance of translation may be selected as a distance smaller than a dimension of the induction head of the induction head assembly. In some cases, the induction head assembly may be moved continuously and at a speed sufficiently slow to allow for a desired level of incineration and removal of coating material from the substrate.

According to some example embodiments, the coil of induction head 102 may be flat (e.g., arranged such that the coil elements are arranged on or parallel to a coil plane). The coil may also be spiral-shaped. In such embodiments, the magnetic field may be generated perpendicular to the plane of the coil, making this type of coil suitable for transferring energy to flat surfaces. The coil may also be cylindrical, generating a magnetic field along the axis of the coil. Such coils may be used for cylindrical or tubular substrates. According to some other embodiments, the coil may include a U-shaped coil. In such embodiments, the magnetic field will be generated between the legs of the coil, moving horizontally from one leg to the other. Such coils may be used for localized areas or edges of components. Any other suitable shape of coil may also be used to remove coating from flat surfaces, round contoured surfaces, inside corners, outside corners, opposite sides of a substrate, round rivets, bolts or any other type of surface.

In addition to the coil associated with induction head 102, a shape or envelope associated with induction head 102 may also be configured with any shape suitable for a particular application. In some cases, induction head 102 includes a rectangular shape, where a length of the head is greater than a width. Induction head 102 may be made from various materials. In some embodiments, induction head 102 may include copper, or aluminum, or other materials with electrical conductivity sufficient for enabling efficient energy transfer from the induction head 102 to the substrate. Induction head 102 may include other materials and configurations. For example, in some embodiments, induction head 102 may include ceramic material(s) or other insulating materials with electrically conductive materials disposed within or on a surface of those materials.

The surface of the induction head that comes into contact with the coating (referred to as the 'contacting side') may exhibit either a flat or textured design. For instance, a textured induction head surface may facilitate the removal of coating material from the surface. Once heat has been generated by the induction assembly head and at least a portion of the coating has been incinerated or separated from the substrate, moving a textured induction head in a direction that exposes intact coating material may induce friction between the induction head and the incinerated and/or separated coating. This friction, in turn, may aid in dislodging the incinerated and/or separated coating from the substrate. The texture on the contacting side can take various forms. It may consist of a regular pattern specifically designed to maximize friction when the induction head assembly moves in a particular direction. Examples include micrometer-scale or millimeter-scale patterns organized in a periodic lattice. Alternatively, the texture could comprise randomly arranged micrometer-scale or millimeter-scale patterns. These patterns may be uniform in size and shape, or they could vary randomly in size and shape. The overall size, shape, and arrangement of these patterns contribute to the desired level of friction between the induction head assembly and the incinerated and/or separated coating, while ensuring that the displacement of the induction head assembly remains comfortable.

According to some example embodiments, the substrate may be pre-heated before utilizing the induction system. Pre-heating the substrate may cause differential thermal expansion between the substrate and the coating, weakening the bond between them and making it easier to remove the coating. Pre-heating the substrate may also reduce the risk of thermal shock in the substrate which may cause damage to the substrate. The pre-heating of the system may be operated by infrared heaters, hot plates, heat guns or torches, for example.

In the disclosed embodiments, the power supply 103 and the at least one induction head 102 are configured to deliver energy to the coating at an energy density level at or above an incineration threshold for the coating. The energy density delivered by the induction system may depend on both the coating and substrate properties, including the coating thickness. The coating material may include various types of materials, such as epoxy, urethane, lead-based paints, fire retardant, organic materials, glued rubber, vulcanized rubber, chlorinated rubber, etc. In many cases, the coating may also include hazardous ingredients, such as lead, chromium or cadmium-based pigments included in some types of paints.

The disclosed induction system may operate relative to various types of substrate materials. In some cases, the substrate may include metallic materials (e.g., ferrous-based metals). To achieve an energy density at or above the incineration threshold of the coating material(s), various parameters of the induction system may be adjusted. At least some of these parameters include voltage, current, current frequency, induction head-to-substrate distance, contact duration, and induction head movement speed.

The voltage (V) and current (I) supplied by the power source determine the energy output (P) of the induction system, following the formula $P=V\times I$. The frequency of the alternating current influences the penetration depth of the magnetic field generated by the induction coil. Lower frequencies penetrate deeper into the substrate, making them suitable for thicker coatings, while higher frequencies result in shallower heating, ideal for thin coatings or surface treatments. In some example embodiments, the induction system operates at an output frequency of 10-25 KHz. The distance (d) between the induction head and the substrate affects the intensity of the magnetic field (B) applied to the substrate, following the relationship $B\propto 1/d^2$. The closer the induction head is to the substrate, the stronger the magnetic field. Additionally, the contact duration and speed of the induction head movement control the energy transferred to the substrate: longer contact results in more energy transfer and a higher substrate temperature.

The number of coils included in the induction head may also be selected to promote a desired level of energy transfer to the substrate/coating. For example, increasing the number of coils can increase the strength of resulting magnetic fields generated by the induction head, which can promote increased transfer of electrical energy to the substrate through induction. The coils of the induction head may be arranged concentrically. In some cases, induction head 102 includes 10 or more coils. In other cases, induction head 102 may include at least 100 coils or at least 1000 coils.

The energy density of the induction system may be selected or otherwise controlled by a user and adjusted until it reaches the incineration threshold of a particular coating. Any of the above-mentioned parameters of the induction system may be adjusted, alone or in combination, to reach the incineration of the coating.

In accordance with some example embodiments, the energy density of the induction system may be adjusted to prioritize the detachment of the coating rather than its incineration. For indoor applications where fumes could be hazardous, the system parameters may be configured to ensure the coating detaches from the substrate without being incinerated.

According to some example embodiments, the energy density delivered by the induction system may be pre-set by a user knowing the nature and thickness of the coating and the nature of the substrate. The contact duration may be controlled by a timing system while remaining parameters of the induction system may be theoretically or empirically known for the corresponding coating and substrate.

The parameters of the induction system may also be automatically selected and adjusted based on data received by the induction system. The induction system may for example include a substrate temperature-measuring device (e.g., a pyrometer, or laser thermometer). The energy density delivered by the induction system may for example be modified according to a measured temperature of the substrate (e.g., in a feedback loop), and the induction system may stop delivering energy to the substrate once a temperature of the substrate corresponding to the incineration threshold of the coating is reached. The substrate temperature-measuring device may also include a temperature control security system. For example, if the temperature of the substrate reaches a predetermined threshold value, the induction system may shut off and interrupt the heat induction process. This predetermined threshold value could, for instance, be set to a fraction of the temperature needed to alter materials properties or structure of the substrate. In some cases, the threshold temperature may be approximately 800° F. for some metals. Other threshold temperature values may be used (e.g., set by a user) depending on the requirements of a particular application. The data received by the induction system may also include data generated by laser scanning or machine vision of the surfaces to be treated.

Induction system 1001 may also include other components, such as various types of cooling units. In some cases, induction system 1001 includes a water chiller or an air cooler. Such cooling systems may be integrated with induction system 1001 or may be used separately. The water chiller or other type of cooler can be employed to maintain the induction coating removal unit at a suitable operating temperature during the induction coating removal process.

In some embodiments, induction system 1001 may include one or more automated components designed to provide controlled, automatic movement of the induction system relative to a coated substrate. For example, induction system 1001 may include a motor for controlling the motion of the induction system via one or more drive wheels. Additionally, one or more tracks may be used to allow the induction system to travel a predetermined path relative to a substrate. For example, the track(s) may be attached to a substrate (e.g., via one or more magnetic fixtures), and the induction system motor may cause motion of the induction system along the track(s) (e.g., via drive wheels, a screw drive mechanism, etc.). Such a system may assist in providing uniform energy delivery to the substrate/coating (e.g., through precise control of an induction head-to-substrate distance and/or a relative speed between the induction head and the substrate).

In automated embodiments, two or more operating portions of the system may be integrated together into a single unit carried by a frame. The frame may be moveable on wheels or rollers, or may be moved via a screw drive mechanism (or any other suitable drive system). The frame may be moved along a track to control the direction of operation during surface treatment. The track may be a supplied part of the coating removal system. In other cases, the coating removal system may take advantage of existing infrastructure, such as using I-Beam flanges as rails to facilitate motion of the coating removal system. In still other cases, the coating removal system may be mounted to a robotic crawler system designed to navigate coated infrastructure (e.g., bridges, ships, buildings, etc.). In some cases, one or more components of the coating removal system (e.g., the induction system, the laser ablation system, and/or the waste management system, etc.) may be removably attached to a frame or housing such that any of those components may be detached from the integrated system and used independently (e.g., for detailing and treating hard to access areas).

When the substrate's temperature reaches the incineration threshold for the coating, the induction system may partially or completely incinerate the coating, leaving behind fumes and incinerated waste in the vicinity of the substrate. The waste removal system 1002 handles the evacuation of at least a portion of the coating, including incineration products generated by delivery of the energy to the coating. In some embodiments, the data received by the induction system to control the automation of the system may also include waste sensing in the waste removal system 1002 (particulate flow, presence of carbon, etc.).

Waste removal system 1002 may include various components and configurations to facilitate removal of incineration products generated through inductive heating of the substrate/coating. In some example embodiments, the waste removal system 1002 may include at least one vacuum system 110. Optionally, waste removal system 1002 may include a scraper blade 114 associated with the at least one vacuum system, wherein the scraper blade 114 is configured to dislodge at least some of the incineration products generated by delivery of the energy to the coating. As noted, operation of vacuum system 110 may be automated based on various observed conditions, such as a temperature threshold associated with the substrate or coating, a detection of one or more changes associated with a coating as a result of incineration (e.g., color changes, blistering, etc.), a detection of incineration products (e.g., airborne particulates, fumes, smoke, etc.), among other sensed conditions.

Waste removal system 1002 may also include one or more filter components. For example, in some cases, waste removal system 1002 may include a filter unit including a carbon filter and/or a HEPA filter.

In some cases, waste removal system 1002 may include only a single vacuum system 110. In such cases, vacuum system 110 may be used for removal of incineration products produced through operation of induction system 1001 and may also be used for removal of ablation products generated through operation of laser system 116 (discussed further below). In other cases, waste removal system 1002 may include separate vacuum systems 110 for each of the induction system 1001 and the laser system 116.

The combined effect of the induction system 1001 and waste removal system 1002, in most cases, results in a well-prepared surface for the laser system 116. In some cases, treatment of a coating with induction system 1001 and waste removal system 1002 provides a clean substrate surface free of even residual coating layers. In such cases, subsequent treatment of the substrate surface using laser system 116 may assist in removing any small amount of coating residue (e.g., coating layers not immediately observable with the naked eye) to provide a bare substrate. In other cases, treatment with induction system 1001 may leave behind a thin layer of residual coating, which can be removed using laser system 116.

The residual layer of coating may be defined as the portion of coating that was not removed after the use of the induction system, the vacuum system 110 or optionally the scraper blade 114, wherein the induction system includes the at least one induction head 102 and the power supply electrically connected to the at least one induction head. In such embodiments, laser system 116 may be configured to ablate or burn off by thermal decomposition the residual layer of coating on the substrate. The residual layer of coating may include at least one of an organic coating, surface rust, hydrocarbon residues or contaminants from the original coating.

The laser system 116 may comprise at least one of a pulsed laser, a roller-supported pulsed laser, or a continuous wave laser. In some embodiments, the power of the pulsed laser may be set to any suitable value between 300 W and 2 kW. In other embodiments, the power of the continuous laser may be set to any suitable value between 100 W and 2 kW. The pulsed laser may for example include a CO2-TEA laser or a Nd:YAG laser. In some cases, the pulsed laser employs a high power (500 W) pulsed Nd:YAG laser (1064 nm wavelength) for the removal of organic coatings, surface rust, hydrocarbon residues, and contaminants from the base metal, including low level fixed radiological contamination. In yet another aspect, the pulsed laser process employs a high power (600 W) pulsed Nd:YAG laser (1064 nm wavelength), a high power (2 kW) pulsed Nd:YAG laser (1064 nm wavelength), or a medium power (300 W) pulsed Nd:YAG laser (1064 nm wavelength).

In some embodiments, the nature of the laser (pulsed or continuous), the power of the laser, the frequency of the laser, the pulse duration, the pulse frequency and the duration of exposure of the coating to the laser may be chosen as a function of any of at least one of the nature of the coating, the thickness of the coating, the nature of the substrate, or eye safety regulations. For example, a lower pulse frequency may be used to remove thicker layers of coating, and a higher pulse frequency may be used to remove thinner layers of coating. In some cases, a continuous wave laser ablation system may offer variable output power capability between, e.g., 200 W–2 kW.

For example, a UV or visible laser with low power settings and short pulse duration (nanosecond to picosecond range) may be chosen for organic coatings. An infrared laser with higher power settings and longer pulse durations in the nanosecond to millisecond range may be chosen for organic coatings or surface rust, with power levels associated with surface rust residual layers being lower than power levels associated with organic coating residual layers.

Various types of laser emitters may be used in the laser ablation system. In some cases, a roller supported pulsed laser emitter may emit multiple laser beams simultaneously. One or more of the emitted laser beams may be scanned relative to the work surface, including residual coating material. In some cases, the scanned laser beam(s) may be arranged in a linear, equally spaced apart arrangement. The laser(s) may be scanned using various scanning patterns, such as linear patterns, circular patterns, rectangular patterns, or any other desired patterns. The roller supported pulsed laser emitter may include two or more pulsed laser support wheels to support the roller supported pulsed laser emitter at a constant distance from the surface of the substrate.

In operation, the pulsed laser emitter emits a scanned pulsed laser beam aimed towards and focused upon the subject surface. The pulsed laser emitted beam generates plasma which ablates, or burns off by thermal decomposition, residual material remaining after the induction process, which converts the residual material into vaporized residue. The vaporized residue is collected by a vaporized residue collection vacuum generated by a fume extractor. The fume extractor can be integrated into the pulsed laser emitter/laser ablation system, or may be provided as separate equipment.

The power of the pulsed laser emitted beam and the distance between the laser emitter and the work surface can be adjusted based on the composition of the residual material and/or the thickness of the residual material remaining on the substrate surface.

The vaporized residue from the ablated subject coated member base layer is collected using the fume extractor. The fume extractor can be independent of the pulsed laser, or the fume extractor can be integrated into a pulsed laser system. The ablation process in combination with the fume extractor (wasted management system) may eliminate a requirement for use and installation of expensive material containment equipment.

The process continues with an optional decision step of determining if there is any heavy corrosion (such as laminar rust), remaining after laser ablation, which needs to be removed. If there is any corrosion not removed by the laser, such as laminar rust, that needs to be removed, the process can employ a needle scaler, or power chisel, to remove such corrosion from the substrate surface. Other corrosion removal techniques may include use of a manual or powered wire brush, or other mechanical means. The laser ablation process may be repeated until a desired level of surface cleanliness is achieved. Once the substrate is cleared, the substrate may be inspected to identify if any repairs are required. If needed, the repairs are completed using suitable repair processes, such as welding, brazing, metal stitching, hammering, and any other suitable metal repair process. Once the substrate is considered to be structurally sound, any finishing work is accomplished. Finishing can include machining, grinding, sanding, polishing, etc. The surface can additionally be prepared if final cleaning is required before applying a new coating. Once the surface is properly prepared in accordance with the recommendations of the project specifications, a new base coat can be applied to the prepared bare subject substrate member surface. An outer or protective coating may be applied to the new base coat.

Power to the coating removal system may be provided via a fixed power grid or portable power supply such as an electric power generator. Power can be provided to primary equipment, including the induction coating removal unit and a pulsed laser ablation system either directly from a generator or via an optional electric power distribution panel. Similarly, power can be provided to support equipment, such as a water chiller and a fume extractor either directly from the generator or via an optional electric power distribution panel.

Figure 4A:
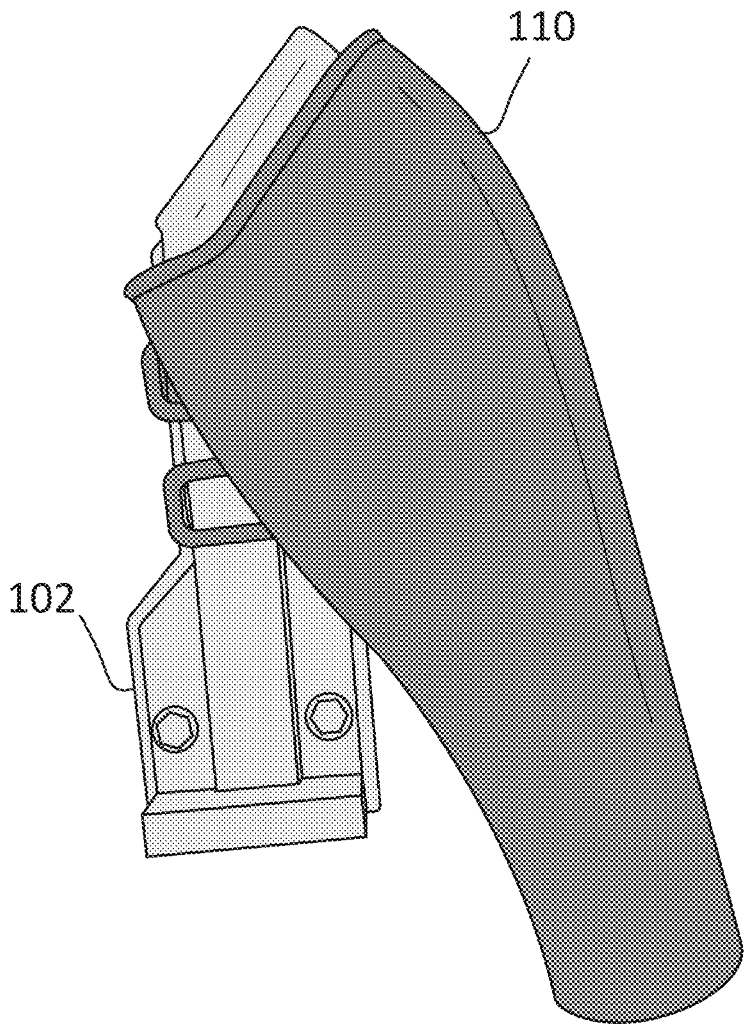
FIGS. 4A-4B illustrate a vacuum nozzle, according to exemplary disclosed embodiments.
Figure 4B:
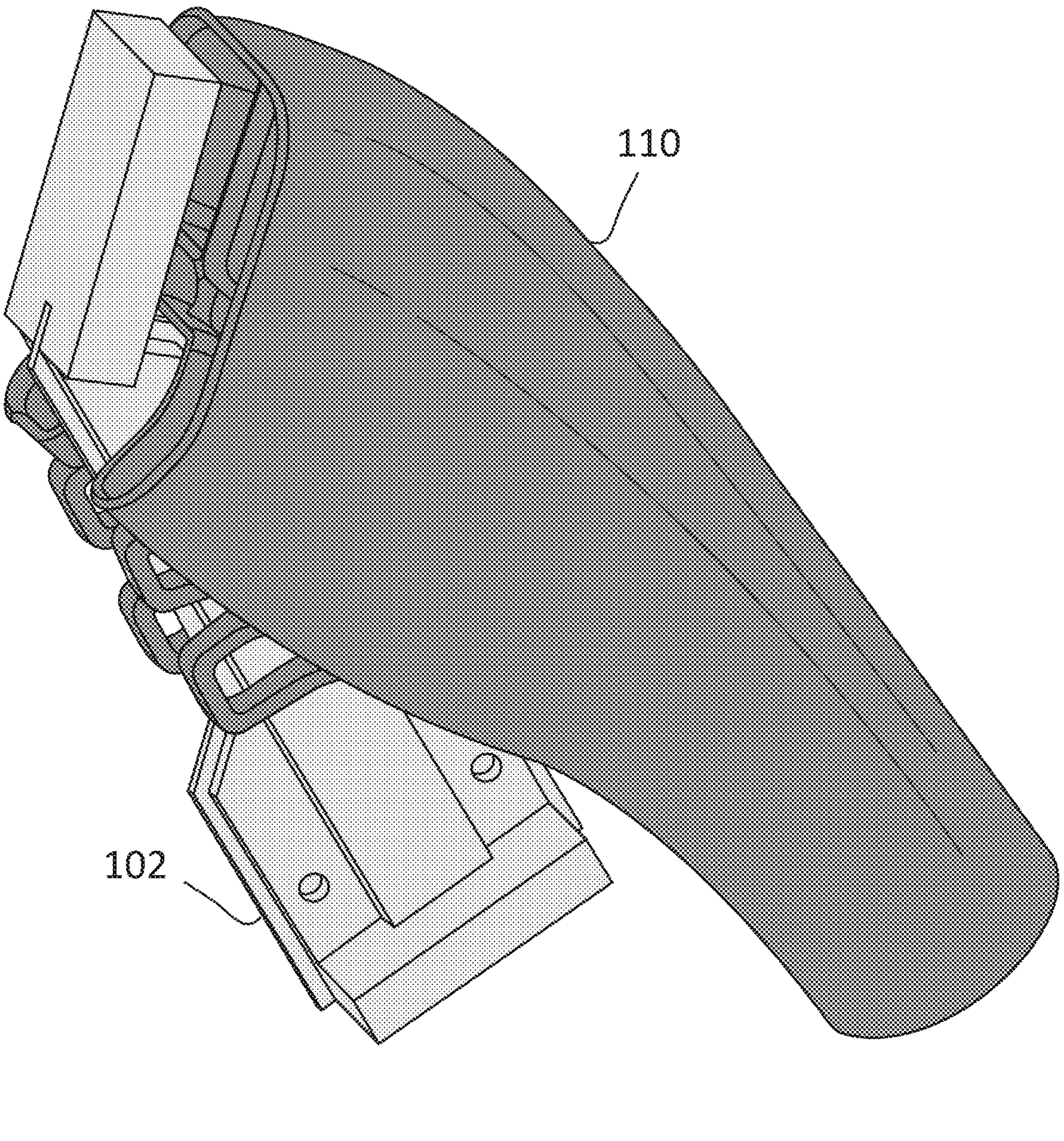

In some cases, the disclosed waste extraction system may include a vacuum nozzle attached to the pulsed laser end effector to point source extract ablated material from the workpiece and transfer the ablated material by vacuum from a fume extractor with multi-stage filtration. The vacuum nozzle may for example be made and adapted to the size and/or shape of the induction head. Examples of vacuum nozzles may be seen in FIGS. 4A-4B, where the vacuum nozzle 110 is attached to the induction head 102. The vacuum nozzle may for example be designed with a CAD (Computer Aided Design) software and be fabricated with a 3D printer or a CNC (Computer Numerical Control) machine. The editable nature of the vacuum nozzle allows for adaption to virtually any induction head or laser system. The distance between the nozzle and the substrate may also be adapted to the nature of the coating, shape of the substrate or type of vacuum system. The material used for the vacuum nozzle may also be selected to withstand the high temperature surrounding the induction head for example, or the environmental conditions in which the system is used. The filter unit may include self-cleaning particle filter(s), activated carbon filter and/or a high-performance HEPA filter to collect particles and gases produced by the laser ablation process.

In some embodiments, the coating removal process can be fully automated, with all operating components—the induction system 1001, the laser system 116 and the waste removal system 1002—integrated into a single unit. This automated system can move autonomously from one zone of the substrate to another once a predetermined portion of the coating is removed. The movement can be facilitated by wheels, rollers, tracks, or a magnetically mounted robot crawler.

In some embodiments, the assessment of whether the predetermined portion of the coating has been removed can be performed using at least one of visual inspection with a camera coupled with image analysis, surface profilometry, colorimetry, reflectometry, adhesion testing, or thickness measurement. The predetermined portion of the coating to be removed before the system moves to a new zone can be adjusted based on the surface nature. For example, it may be set to 100% for flat surfaces but less for non-flat surfaces.

In some embodiments, the operations portions of the system may be dismounted and used independently for areas where all the coating has not been removed or in areas where the automated unit cannot fit or move. It is to be appreciated that different components of the system may be used in a variety of different configurations without departing from the scope of the disclosed embodiments. In some embodiments, all components of the system may be used independently. In other embodiments, various combinations of at least two components of the system may be used.

Figure 2A:
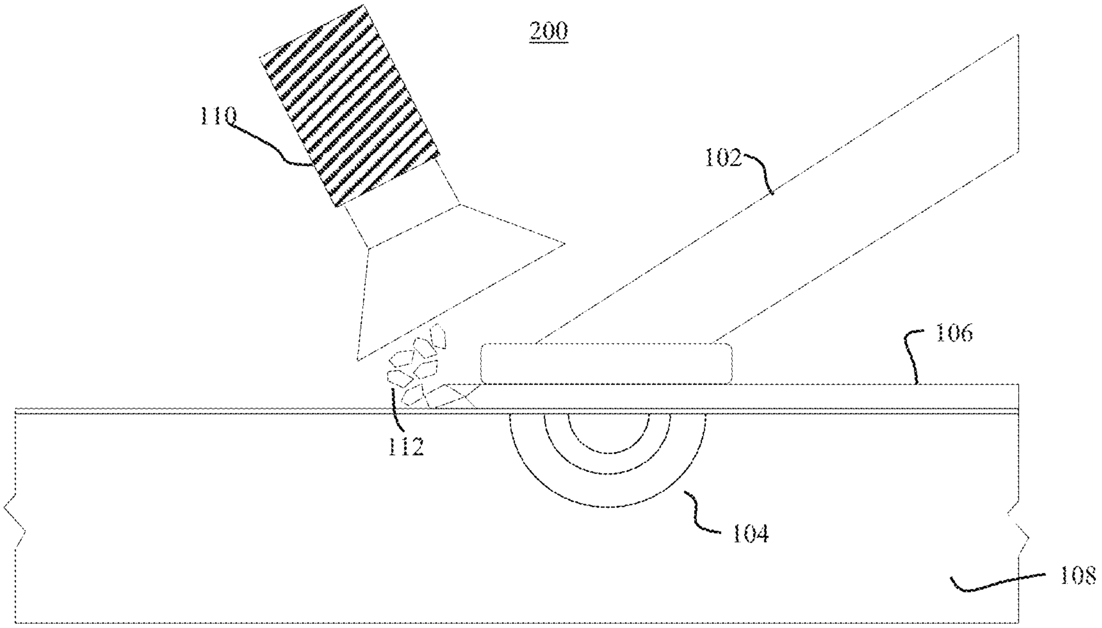
FIGS. 2A-2D provide diagrammatic representations of systems for removing coatings from a substrate, according to exemplary disclosed embodiments; and, FIG. 3 provides an exemplary flow diagram of a method for removing coatings from a substrate, according to exemplary disclosed embodiments.

FIGS. 2A-2D include schematic representations of examples of coating removal systems, consistent with some embodiments of the present disclosure. Referring to FIG. 2A, a diagrammatic representation of an example of a coating removal system 200, consistent with some embodiments of the present disclosure, is provided. Coating removal system 200 may include an induction system and a vacuum system 110. According to some embodiments, the induction system may include an induction head 102 and a power supply (not represented in FIG. 2A), wherein the power supply and the induction head 102 are configured to deliver energy via magnetic fields 104 to the coating 106 at an energy density level at or above an incineration threshold for the coating. Furthermore, vacuum system 110 may be configured to extract at least a portion of the coating, including incineration products generated by delivery of the energy to the coating 112.

As shown in FIG. 2A, vacuum system 110 and induction head 102 may be used separately as two different systems, vacuum system 110 following induction head 104. However, in some example embodiments, vacuum system 110 may be incorporated in induction head 102 (e.g., in a common housing).

Figure 2B:
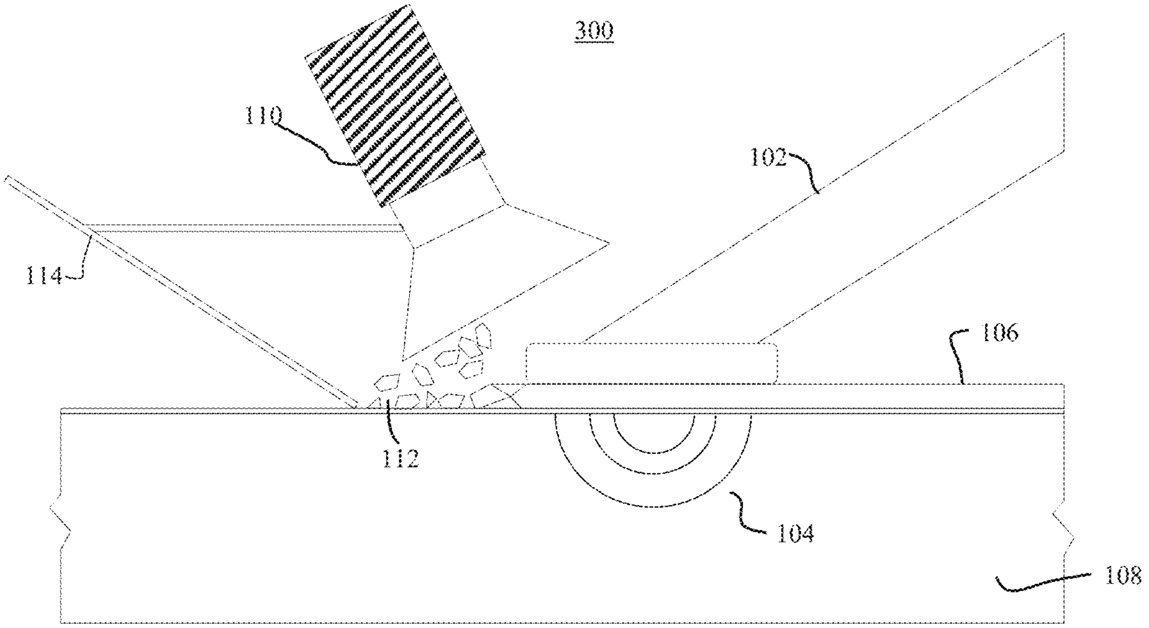

In FIG. 2B, another example of a coating removal system 300, consistent with some embodiments of the present disclosure, is presented. Coating removal system 300 may include an induction system, a vacuum system 110 and a scraper blade 114 associated with vacuum system 110. According to some embodiments, the induction system may include an induction head 102 and a power supply (not represented in FIG. 2B), wherein the power supply and the induction head 102 are configured to deliver energy 104 to the coating 106 at an energy density level at or above an incineration threshold for the coating. Scraper blade 114 may be configured to dislodge at least some of the incineration products generated by delivery of the energy to the coating, and vacuum system 110 may be configured to extract at least a portion of the coating, including incineration products generated by delivery of the energy to the coating 112. For example, if the energy delivered to the coating was not sufficient to incinerate the totality of the coating 106, some part of the coating 106 may still be partially attached to the substrate 108. In such cases, scraper blade 114 may help dislodge and guide the part of the coating that has not been incinerated toward vacuum system 110. In some cases, scraper blade 114 may also assist in removing incineration products that remain adhered to the substrate. Additionally, scraper blade 114 may assist in guiding incinerated waste products towards vacuum system 110.

It should be noted that while a scraper blade is shown, other components may be included or used in combination with or as an alternative to the disclosed scraper blade. For example, in some cases, the disclosed systems may include (or may be used in conjunction with) a needle gun, needle scaler, or power chisel. Such tools use pressurized air or electric power to force chisel needles or bits back and forth. The chisel needles or bits move rapidly across a surface to remove debris, such as laminar or pack rust, scale, and concrete splatter, dirt, or other bulk residues from the workpiece as needed before or after the induction process or laser ablation process.

Notably, in comparison to traditional coating removal systems (e.g., media blasting systems), the disclosed systems may provide clean, smooth finished surfaces following induction and laser ablation treatments. For example, in some cases, the disclosed systems may provide a finished surface on the substrate or base material that has a surface profile of less than 25 nanometers (<5 microns) of differentiation (roughness profile). This compares to a surface profile of less than +65/−55 nanometers (>12 microns) of differentiation (roughness profile) resulting from a grit blasting coating removal process.

As shown in FIG. 2B, a vacuum system 110 fitted with a scraper blade 114 may be used separately from induction system 102 (e.g., as two independent systems). In such embodiments, vacuum system 110 may follow behind induction system 102. In other cases, however, vacuum system 110 (and optional scraper blade 114) may be incorporated together with induction system 102 to provide an integrated system.

Figure 2C:
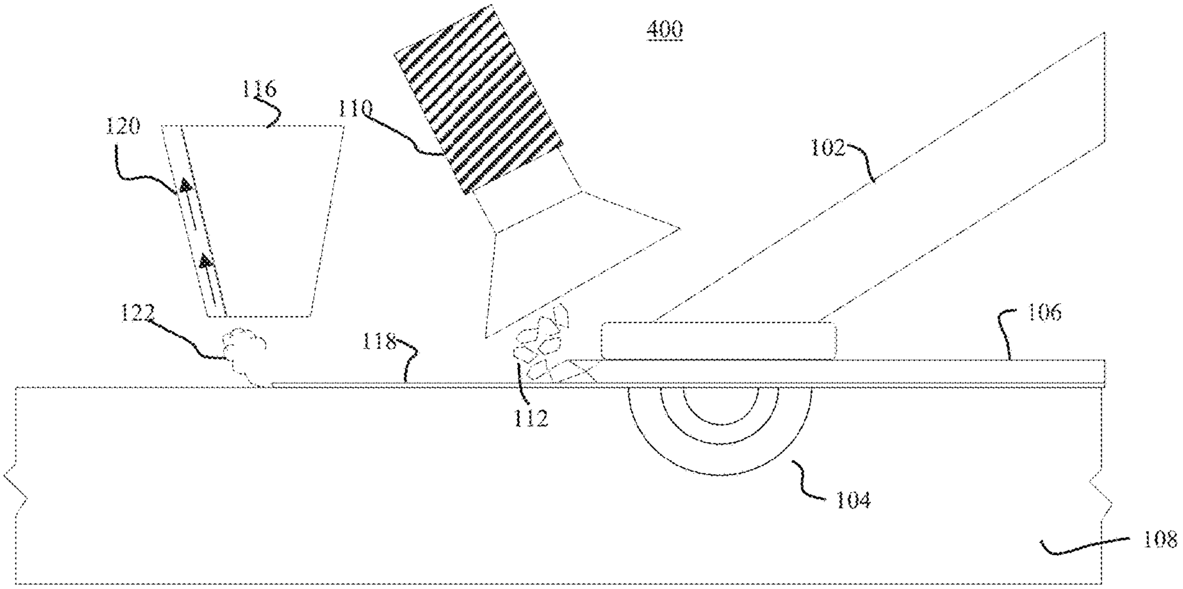

Referring to FIG. 2C, a diagrammatic representation of another example of a coating removal system 400, consistent with some embodiments of the present disclosure, is provided. Coating removal system 400 may include an induction system, a first vacuum system 110, a laser system 116 and a second vacuum system 120. The induction system and vacuum system 110 may be configured as explained previously (for example in FIG. 2A and FIG. 2B), and laser system 116 may be configured to ablate or burn off by thermal decomposition of a substrate residual layer 118. As explained previously, residual layer of coating 118 is defined as the portion of coating 106 that was not removed after the use of at least one of the induction system or the waste removal system. According to some example embodiments, residual layer of coating 118 may include at least one of an organic coating, surface rust, hydrocarbon residues or contaminants from the original coating layer, among other residual materials. Furthermore, vacuum system 120 may be configured to extract products generated by the ablation or thermal decomposition of the residual layer of coating. In other words, and as shown in FIG. 2C, the induction system delivers energy to coating 106, incinerating at least a portion of it. The incineration waste is evacuated by vacuum system 110, leaving a residual layer of coating 118 on the substrate 108. Laser system 116 follows, ablating residual layer 118, and creating ablation waste 122 (e.g., fumes, particulate, etc.), and vacuum system 120 evacuates the ablation waste.

In some embodiments, vacuum system 110 may be incorporated into induction system 102 and vacuum system may be incorporated into laser system 116, as shown in FIG. 2C. In some other embodiments, vacuum systems 110 and 120 may be used separately from induction system 102 and laser system 116. According to some example embodiments, wherein the first vacuum extraction and the second vacuum extraction are performed by the same fume extraction unit.

In yet some other embodiments, the induction system, laser system 116, and vacuum systems 110 and 120 may all be incorporated into a fully integrated system. In some other embodiments, at least one system may be used separately from the others.

Figure 2D:
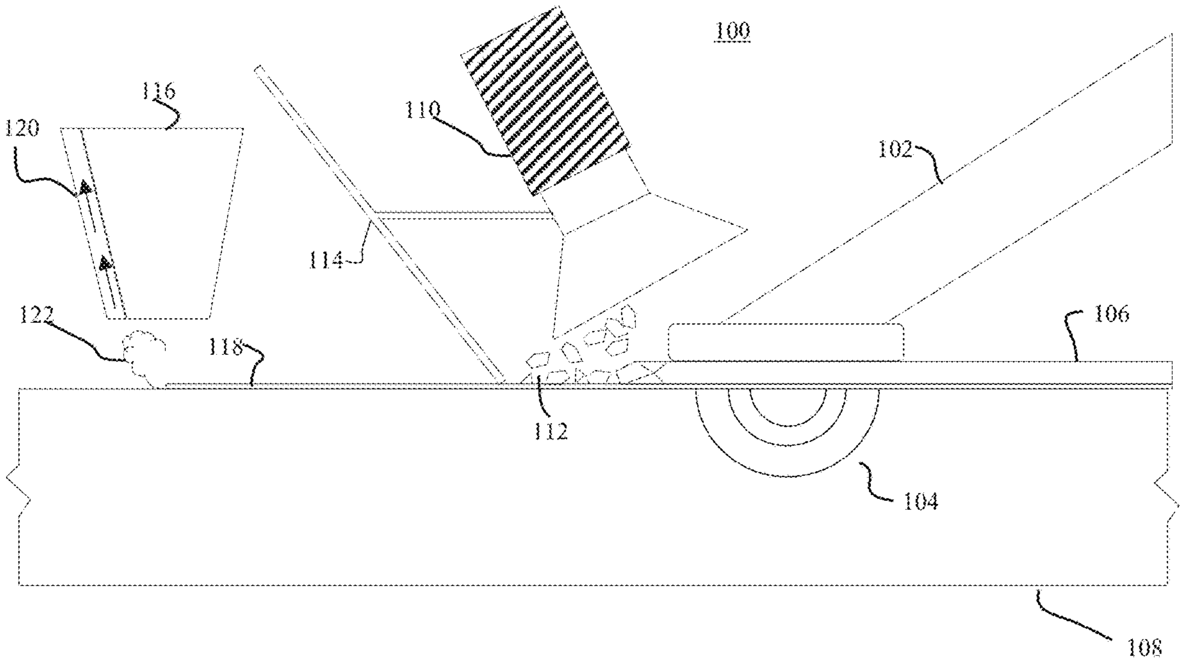
Figure 3:
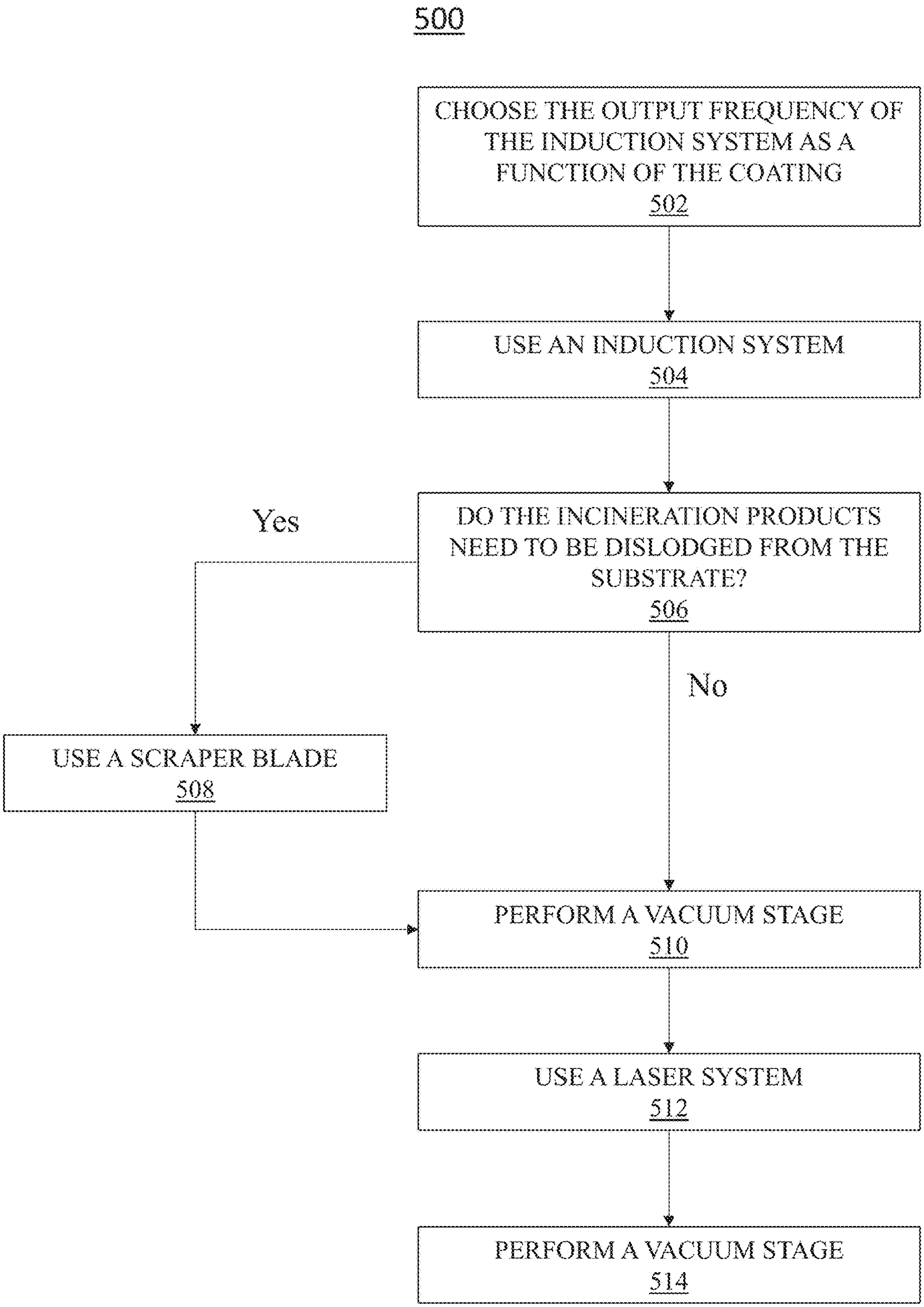

The system disclosed in FIG. 2C may be further modified to include a scraper blade 114, as shown in FIG. 2D. In such embodiments, the elements of the system may be configured as previously described. In some cases, the elements of the system may be incorporated together with one another to form an integrated system, or at least one element of the system of FIG. 2D may be used as a separate component/system.

Figure provides a flowchart representative of an exemplary method for removing a coating from a substrate. At step 502, method 500 may include choosing the output frequency of the induction system between 20 kHz and 50 kHz as a function of the coating, wherein the coating includes at least one of epoxy, urethane, lead-based coating, fire retardant coating, organic coating, glued rubber, vulcanized rubber or chlorinated rubber.

At step 504, method 500 may include using an induction system configured to deliver energy to the coating at an energy density level at or above an incineration threshold for the coating.

At step 506, method 500 may include determining whether the incineration products generated by the delivery of energy to the coating need to be dislodged from the substrate. If the incineration products need to be dislodged, at step 508 method 500 may include using a scraper blade associated with the vacuum system, wherein the scraper blade is configured to dislodge at least some of the incineration products generated by delivery of the energy to the coating. If the incineration products do not need to be dislodged, or if they do and step 508 has already been performed, at step 510 method 500 may include performing a vacuum stage to extract at least a portion of the coating, including incineration products generated by delivery of the energy to the coating.

At step 512, method 500 may include using a laser system configured to ablate or burn off by thermal decomposition the substrate residual layer of coating.

As mentioned earlier, the nature of the laser (pulsed or continuous), the power of the laser, the frequency of the laser, the pulse duration, the pulse frequency and the duration of exposure of the coating to the laser may be chosen as a function of any of at least one of the nature of the coating, the thickness of the coating, the nature of the substrate, or eye safety regulations.

At step 514, method 500 may include performing a vacuum stage to extract products generated by the ablation or thermal decomposition of the residual layer of coating. In some embodiments, the first vacuum stage and the second vacuum stage are performed by the same fume extraction unit.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

What is claimed is:

1. A method for removing a coating from a substrate, the method comprising:

applying power to at least one induction head of an induction system using a power supply electrically connected to the at least one induction head, wherein the application of power to the at least one induction head delivers energy to the coating at an energy density level at or above an incineration threshold for the coating, such that at least a portion of the coating is incinerated to produce incineration products, including both solid residue on the substrate along with airborne fumes; and extracting the incineration products generated by delivery of the energy to the coating using a vacuum system.

2. The method of claim 1, further comprising:

dislodging at least some of the solid residue generated by delivery of the energy to the coating using a scraper blade associated with the vacuum system.

3. The method of claim 1, wherein the substrate includes a metallic material.

4. The method of claim 1, wherein the substrate includes a ferrous-based metal.

5. The method of claim 1, wherein the coating includes at least one of epoxy, urethane, lead-based coating, fire retardant coating, organic coating, glued rubber, vulcanized rubber or chlorinated rubber.

6. The method of claim 1, wherein the coating includes at least one of lead, chromium or cadmium-based pigments.

7. The method of claim 1, wherein an output frequency of the induction system is between 20 kHz and 50 KHz.

8. The method of claim 1, wherein the power supply causes alternating current at an induction coil associated with the at least one induction head.

9. A method for removing a coating from a substrate, the method comprising:

applying power to at least one induction head of an induction system using a power supply electrically connected to the at least one induction head, wherein the application of power to the at least one induction head delivers energy to the coating at an energy density level at or above an incineration threshold for the coating, such that at least a portion of the coating is incinerated to produce incineration products, including both solid residue on the substrate along with airborne fumes;

performing a first vacuum extraction using a vacuum system, wherein the first vacuum extraction includes removing the incineration products generated by delivery of the energy to the coating;

using a laser system to ablate or burn off by thermal decomposition a substrate residual layer left behind on the substrate after removing the incineration products; and performing a second vacuum extraction using the vacuum system, wherein the second vacuum extraction includes extracting products generated by the thermal decomposition of the substrate residual layer.

10. The method of claim 9, wherein the laser system comprises at least one of a pulsed laser, a roller-supported pulsed laser, or a continuous wave laser.

11. The method of claim 9, further comprising a scraper blade associated with the vacuum system, wherein the scraper blade is configured to dislodge at least some of the solid residue generated by delivery of the energy to the coating.

12. The method of claim 9, wherein the substrate includes a metallic material.

13. The method of claim 9, wherein the substrate includes a ferrous-based metal.

14. The method of claim 9, wherein the coating includes at least one of epoxy, urethane, lead-based coating, fire retardant coating, organic coating, glued rubber, vulcanized rubber, chlorinated rubber.

15. The method of claim 9, wherein the coating includes at least one of lead, chromium or cadmium-based pigments.

16. The method of claim 9, wherein an output frequency of the induction system is between 20 kHz and 50 KHz.

17. The method of claim 9, wherein the power supply causes alternating current at an induction coil associated with the at least one induction head.

18. The method of claim 9, wherein the substrate residual layer of coating includes at least one of an organic coating, surface rust, hydrocarbon residues or contaminants from a base layer of the coating.

19. The method of claim 9, wherein the first vacuum extraction and the second vacuum extraction are performed by different fume extraction units of the vacuum system.

* * * * *